Patented Oct. 31, 1933

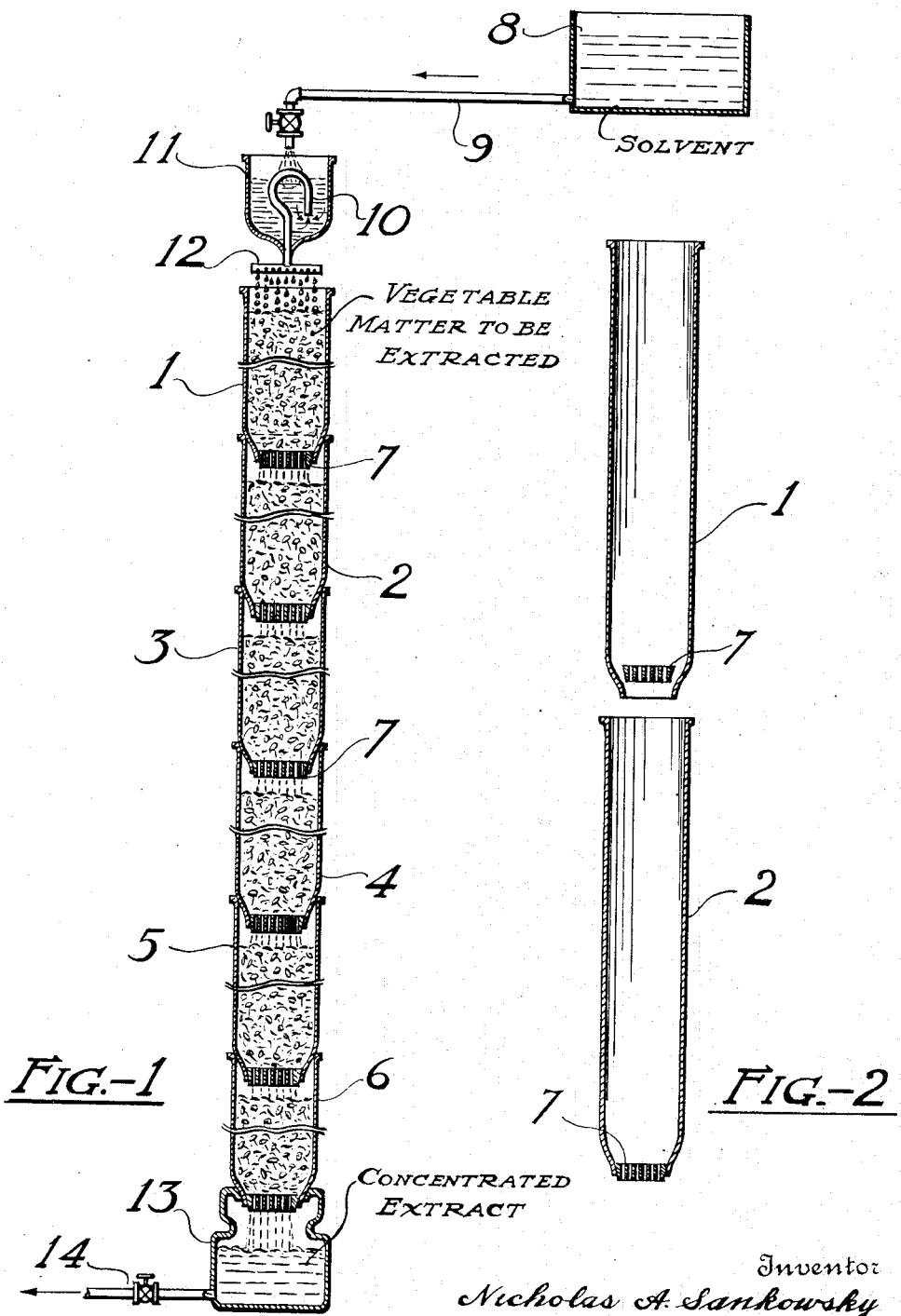

1,933,077

UNITED STATES PATENT OFFICE 1,933,077

METHOD OF EXTRACTION

Nicholas A. Sankowsky, Elizabeth, N. J., assignor to Standard Oil Development Company, a corporation of Delaware Application April 23, 1928. Serial No. 272,100

5 Claims. (Cl. 167—24)

This invention relates to improvements in the extraction of soluble constituents from organic substances, and has for its principal object the direct preparation of very strong extracts. The invention will be described as applied to the manufacture of solutions containing the active insecticidal principle of Pyrethrum (pyrethrins) in relatively high percentages as compared with extracts prepared by the former methods. It will be understood, however, that the methods disclosed are applicable to other organic substances containing soluble medicinal or insecticidal bodies, or other useful extractives.

In the manufacture of Pyrethrum extracts, the practice has been to treat Pyrethrum flowers with large volume of kerosene or other solvents by percolation or centrifuging. Such methods exhaust the flowers adequately but yield an extract containing a very small percentage of pyrethrins contaminated with substantial amounts of inert extractives. Concentration by evaporation is objectionable on account of the ease with which the pyrethrins decompose.

I have found that by limiting the amount of solvent in the manner to be described, far stronger solutions are obtained than by prior methods of direct extraction, without sacrificing the extraction efficiency. In addition, the ratio of inert extractives to pyrethrins is largely reduced by my method. The invention will be fully understood from the following description read in connection with the accompanying drawing, in which Fig. 1 is a diagrammatic side elevation of preferred equipment, and Fig. 2 is a similar view showing the extraction units separately.

Referring to the drawing, 1 to 6 denote a series of cylindrical or conical extraction tanks having tapering bottoms. The form and number of tanks may be varied as desired, but in general, best results are obtained with not less than 6 nor more than 12 tanks. The greater the number of tanks, the more completely the material can be exhausted. The tanks are nested, as shown, and are suitably supported to permit easy vertical shifting. Filter plugs 7 are fitted in the tapering bottoms. Other means, such as perforated plates for retaining the Pyrethrum flowers while permitting the passage of liquid, may be used instead of the filter plugs. Solvent is supplied to the first tank in series from a source of supply 8 through valved pipe 9 and automatic siphon 10 arranged in receiver 11. The siphon discharges through a spray-head 12. A container 13 receives the extract from the last tank 6. A valved pipe 14 is provided for withdrawing the extract from the container.

In operating this system, all the tanks are filled with dried Pyrethrum flowers which are shaken down thoroughly to form compact layers containing, however, multitudinous interstices between the flowers. The dried Pyrethrum flowers when packed into the tanks form a mass containing interstices, numerous small spaces being found between the flowers. Kerosene is then introduced through pipe 9 into receiver 11 and the siphon 10 is adjusted to give the desired flow. It is an essential feature of the invention that the rate of solvent flow shall not be sufficient to flood the interstices between the particles of organic material. I have found that efficient extraction with small volumes of solvent can be obtained by causing the solvent to flow over the flowers substantially as a surface film only. In the term surface film, the intercellular surfaces as well as the extracellular surfaces or exterior of the flowers are included. It is, however, understood that the liquid flow through the intercellular surfaces is governed by diffusion forces rather than by mechanical forces such as gravity.

The physical action of the solvent in my method appears to be a solution by film flow in contact with an extractible substance, under the combined influence of gravity, capillarity, and osmosis. These forces act within the sphere of maximum utility, undisturbed by the flooding with solvent which would result from immersion according to usual prior practice. For example, the gravity flow in my method is between solvent-charged particle and air-filled interstice. This is much more rapid than flow between saturated particle and solvent-filled interstice. The foregoing represents my opinion of the physical action, but the invention is of course not dependent upon the accuracy of any theory advanced.

The following example is illustrative: 40 pounds of dried Pyrethrum flowers were packed by shaking in each of the 6 tanks, which were than arranged in series as shown in the drawing. The kerosene supply and the siphon 10 were adjusted to discharge 5 gallons of kerosene daily into tank 1 in instalments of about 1 gallon at a time with an interval of about 1 hour after each instalment. For a 12 day period, the total extract obtained was 25.7 gallons.

Each day for the first 6 days, the top tank was taken off and the extracted flowers removed from it. This tank was then recharged with 40 pounds of fresh, dried Pyrethrum flowers and placed at the bottom of the series. On the 6th day, accordingly, the tank which was originally at the bottom reached the top. The extracted flowers from the 6 discharged tanks were centrifuged and the solution recovered was added in 6 approximately equal portions daily to the solvent supply.

Similarly during the second 6 days, the exhausted top tank was removed daily and the accumulated flowers from the removed tanks were centrifuged at the end of the 12th day. The emptied tanks were refilled with fresh flowers and put back in series, as before. The liquid recovered by centrifuging was returned to the process.

There remained in the 480 pounds (dry basis) of centrifuged flowers about 34 gallons of kerosene which could not be practicably recovered. The kerosene content of the 6 tanks, containing a total of about 240 pounds of flowers, averaged constantly about 25 gallons. Most of the pyrethrins were extracted from the flowers.

In the method described, the kerosene flows slowly over the surface and through the cells of the flowers. Time is afforded for the intensive solution of pyrethrins, notwithstanding the relatively small volume of solvent. Since the pyrethrins are somewhat more soluble than the inert soluble constituents of the flowers, the pyrethrins preferentially dissolve when the volume of solvent is restricted. In this way I obtain a low ratio of inert to active ingredients. In my product the ratio of active to inert extractives is greater than their absolute solubility ratio.

For example, a pyrethrin extract made by the usual method of flooding the flowers with kerosene contains 0.25% by weight of extractives. A pyrethrin extract prepared by the present method was diluted in the ratio of 1:1035 to make it of substantially the same insecticidal value as the extract prepared by the old method. As so diluted, the extract contains 0.075% by weight of extractives. Since 0.25% in the old type of solution has the same insecticidal value as 0.075% in the solution prepared by this invention, it is evident that the latter solution contains a much smaller proportion of inert matter than the former. Since the inert extractives tend to discolor the product and also to stain textile fabric with which they may come into contact, the importance of preventing or minimizing their solution is obvious.

In general, it may be said that the solvent is introduced at a rate less than the rate of free flow through the system; that is, there is at no time a continuous stream of solvent flowing past the flowers but rather a seepage or film-flow over and through them.

The following example indicates the character of the solvent flow from another viewpoint. Extraction was carried out in a series of 12 superposed tanks each holding about 3.5 pounds of inter-dried Pyrethrum flowers. Kerosene was intermittently supplied to the first tank and was allowed to trickle through the series, as above described. The total weight of flowers extracted in a period of 33 days was 70 pounds. The extract obtained weighed about 0.7 pounds. The ratio of flowers to extract is accordingly 100 to 1 which is about as high as it is practical to go. The extract was approximately 1,035 times as strong, measured by its insecticidal value, as solutions prepared by former direct extraction methods without distillation.

Although these extremely concentrated extracts are useful for some purposes, I generally prefer to have the weight ratio of the flowers to extract between 1:1 and 10:1.

The concentrated extracts may be used to fortify weaker solutions without substantially increasing their volume. However, the chief advantages of the invention are derived from utilizing the concentrated extract as a base from which commercial insecticidal solutions are made directly by dilution, with or without addition of essential oils and their ingredients. The method is especially useful in the manufacture of horticultural insecticides. Emulsified spray mixtures made from ordinary weak kerosene-pyrethrum solutions must contain a relatively large amount of kerosene in order to obtain the required quantity of pyrethrins. The kerosene in such mixtures is harmful to growing plants. The concentrated base produced by this invention, when emulsified with water for horticultural sprays, is harmless to plants. A large amount of pyrethrins is made available in a small volume of kerosene. The amount of water used and the emulsifying agent are determinable by those skilled in the art. Wide variations are permissible according to conditions.

Instead of a series of extraction tanks, a battery of centrifugal machines may be used, the amount of solvent being limited in accordance with the principles outlined above. The flowers are placed in the baskets of the machines which are rotated at an approximately constant speed. Solvent is delivered intermittently upon the interior surface of the material in the basket. Extract discharged from the first centrifugal machine is used as the solvent in the second machine and so on throughout the series. When one charge of flowers in a machine is exhausted, the charge is removed and a fresh supply of flowers put in.

If desired, a single centrifugal machine may be used with a battery of solution tanks. Extracts of progressively decreasing strength are stored separately in the tanks. When the charge of flowers in the centrifugal machine is exhausted, a fresh charge is put in and extracted in order with first the most concentrated extract, then the next strongest, and so on.

In both the percolation and centrifugal methods described, the solvent may be supplied either continuously or intermittently though the latter is generally to be prefered. After the flowers have become saturated with solvent, the production of finished extract is continuous and fairly constant whether fresh solvent is added continuously or intermittently.

While the foregoing description has been based chiefly on the extraction of Pyrethrum flowers with kerosene, the invention includes also the use of other extraction agents, for example, water, alcohol and other organic solvents, for the removal of extractable constituents from various organic substances. Numerous utilizations of the invention will be apparent. As illustrative, it may be used in the preparation of concentrated tanning extracts from quebracho, tan bark, etc.; extracts of logwood and soap bark; perfumers' tinctures and resinoids such as orris root, musk, oak moss, civet, Spanish fly; drug extracts, for example extract of cinchona bark; beef extract, etc. Various changes and alternative procedures may be adopted within the scope of the appended claims in which it is my intention to claim all novelty inherent in the invention as broadly as the prior art permits.

I claim:

1. Process of preparing strong solutions of pyrethrins, comprising placing Pyrethrum flowers in a mass containing interstices, distributing a solvent for pyrethrins over the flowers at a rate less than sufficient to flood said interstices with solvent, whereby the solvent is caused to flow substantially only over the exterior surfaces and through the intercellular surfaces of the flowers, and withdrawing the pyrethrin-containing solution that has passed through the mass.

2. Process of preparing strong solutions of pyrethrins, comprising placing dried Pyrethrum flowers as a mass containing interstices in a number of extraction zones, superposing said zones, intermittently suplying to the top zone kerosene in amount insufficient to fill the interstices of the Pyrethrum flowers, allowing the kerosene to percolate throughout the series of zones, and withdrawing the kerosene solution of pyrethrins from the bottom zone.

3. Process according to claim 2, in which the first extraction zone is removed as soon as its flowers are exhausted, fresh flowers are placed in the removed extraction zone, and it is returned to the system as the bottom zone.

4. Process of preparing strong solutions of pyrethrins in kerosene, comprising providing a series of interstitial masses of Pyrethrum flowers, percolating kerosene through said masses in series, the amount of kerosene being insufficient to flood the interstices, and withdrawing the kerosene-pyrethrin solution, while maintaining at all times a weight ratio between flowers and extract of not less than 1 to 1 nor more than 100 to 1.

5. Process according to claim 4, in which the weight ratio of flowers to extract is between 1 to 1 and 10 to 1.

NICHOLAS A. SANKOWSKY.